United States Patent
Ogura et al.

(10) Patent No.: US 8,337,929 B2
(45) Date of Patent: Dec. 25, 2012

(54) PACKAGED COFFEE BEVERAGE

(75) Inventors: Yoshikazu Ogura, Tokyo (JP); Sayaka Domon, Tokyo (JP); Kiyoshi Kataoka, Tokyo (JP); Ami Moritani, Tokyo (JP); Shinji Yamamoto, Tokyo (JP)

(73) Assignee: Kao Corporation, Tokyo (JP)

( * ) Notice: Subject to any disclaimer, the term of this patent is extended or adjusted under 35 U.S.C. 154(b) by 45 days.

(21) Appl. No.: 12/741,424

(22) PCT Filed: Nov. 19, 2008

(86) PCT No.: PCT/JP2008/071486
§ 371 (c)(1),
(2), (4) Date: May 5, 2010

(87) PCT Pub. No.: WO2009/066794
PCT Pub. Date: May 28, 2009

(65) Prior Publication Data
US 2010/0266726 A1     Oct. 21, 2010

(30) Foreign Application Priority Data

Nov. 20, 2007 (JP) ................................ 2007-300355

(51) Int. Cl.
*A23F 5/24* (2006.01)
(52) U.S. Cl. ........................................ 426/594; 426/433
(58) Field of Classification Search .................. 426/433, 426/590, 594, 596, 425, 106, 131
See application file for complete search history.

(56) References Cited

U.S. PATENT DOCUMENTS

| | | | |
|---|---|---|---|
| 2008/0166451 A1* | 7/2008 | Bel-Rhlid et al. | 426/45 |
| 2009/0011095 A1 | 1/2009 | Yamane et al. | |
| 2009/0035421 A1 | 2/2009 | Yamane et al. | |
| 2009/0053381 A1 | 2/2009 | Fukuda et al. | |
| 2010/0092624 A1 | 4/2010 | Shioya et al. | |
| 2010/0104702 A1 | 4/2010 | Hayakawa et al. | |

FOREIGN PATENT DOCUMENTS

| | | |
|---|---|---|
| EP | 1 716 757 A1 | 11/2006 |
| EP | 1 856 982 A1 | 11/2007 |
| JP | 07184546 A * | 7/1995 |
| JP | 2003-204755 | 7/2003 |
| JP | 2003-204756 | 7/2003 |
| JP | 2003310162 A * | 11/2003 |
| JP | 2006 230402 | 9/2006 |
| JP | 2007 61046 | 3/2007 |
| JP | 2007-61046 | 3/2007 |
| JP | 4012560 | 9/2007 |
| JP | 4012561 | 9/2007 |
| JP | 4 012560 | 11/2007 |
| JP | 4 012561 | 11/2007 |
| JP | 2008-187931 | 8/2008 |
| JP | 2008-199950 | 9/2008 |
| WO | WO 2005-072533 A1 | 8/2005 |
| WO | WO 2008/093892 A1 | 8/2008 |
| WO | WO 2008/102892 A1 | 8/2008 |

OTHER PUBLICATIONS

JP 2003310162 A, Fujio, Kunihisa, Abstract Translation Nov. 5, 2003.*
JP 407184546 A, Yamada, Masaki and Junko Kahara, Abstract Translation Jul. 25, 1995.*
Heath, Henry B., Source Book of Flavors, Van Nostrand Reinhold, 1981, pp. 165.*
Office Action issued May 28, 2012, in Chinese Patent Application No. 200880117041.1, filed Nov. 19, 2008 (with English translation).

* cited by examiner

*Primary Examiner* — Kelly Bekker
*Assistant Examiner* — Hong T Yoo
(74) *Attorney, Agent, or Firm* — Oblon, Spivak, McClelland, Maier & Neustadt, L.L.P.

(57) ABSTRACT

The present invention provides a packaged coffee beverage subjected to heat-sterilization, wherein
(A) a concentration of chlorogenic acids is not less than 0.1% by mass and less than 0.14% by mass,
(B) a mass ratio of chlorogenic acids/tannin (FOLIN-DENIS method) is in the range of 0.6 to 1.0, and
(C) a mass ratio of dichlorogenic acids/chlorogenic acids is in the range of 0.07 to 0.16.

12 Claims, No Drawings

PACKAGED COFFEE BEVERAGE

FIELD OF THE INVENTION

The present invention relates to a packaged coffee beverage.

BACKGROUND OF THE INVENTION

As a therapeutic agent for hypertension, there are medicinal drugs such as various neuroleptic agents acting on regulation systems by neural factors, ACE inhibitors acting on regulation systems involving humoral factors, AT-receptor antagonists, Ca antagonists effecting on regulation systems by vascular endothelium-derived substances, and antihypertensive diuretics effecting on humoral regulation systems in the kidney. These drugs are mainly used for serious hypertensive patients in medical institutions. Medicinal drugs used against hypertension at present provide satisfactory efficacy but heavily burden a patient with not a few side-effects.

Therefore, general therapies for improving the quality of life such as dietary therapy, exercise therapy, and restriction of alcohol drinking and smoking are applied to a wide range of patients from prehypertension to serious hypertension. With the growing recognition of importance of general therapies, there have been mentions particularly for importance of improvement of dietary life. Under such circumstances, foods having hypotensive effects have been actively searched for a hypotensive material derived from foods, and many active ingredients thereof have been isolated and identified.

W0-A05/72533 describes that a coffee beverage composition containing hydroxyhydroquinone in a decreased amount such that a weight ratio of hydroxyhydroquinone/chlorogenic acids is not more than 10/10000 exhibits a hypotensive action.

JP-A2003-204755 and JP-A2003-204756 propose coffee beverages containing chlorogenic acids at high concentration produced by blending an extracted liquid of raw beans.

SUMMARY OF THE INVENTION

The present invention provides a packaged coffee beverage, subjected to heat-sterilization, wherein
(A) a concentration of chlorogenic acids is not less than 0.1% by mass and less than 0.14% by mass;
(B) a mass ratio of chlorogenic acids/tannin (FOLIN-DENIS method) is in the range of 0.6 to 1.0; and
(C) a mass ratio of dichlorogenic acids/chlorogenic acids is in the range of 0.07 to 0.16.

The present invention also provides a method for producing the packaged coffee beverage, including:
step 1: treating a coffee extraction liquid of roast coffee bean having an L value of 14 to 25 with an adsorbent to give a coffee extract (a);
step 2: mixing the coffee extract (a) with a coffee extract (b) of roast coffee bean having an L value of 35 to 55 to give a coffee liquid; and
step 3: heat-sterilizing the coffee liquid,
and further including a step of adding a mannan-degrading enzyme to the coffee extraction liquid before the step 3.

DETAILED DESCRIPTION OF THE INVENTION

In some cases, packaged beverage products are stored under high temperature conditions due to the nature of the products. Stability thereof under such conditions is important. Particularly for a packaged coffee beverage, stability under such conditions is very important, because precipitation in the coffee beverage adversely affects its taste and may be a cause of complaint. When a product has an appealing physiological effect, in order to ensure the physiological effect, the product must be finished such that an ingredient involved in the effect can be taken in an amount necessary for achieving the effect of the product. Therefore, the packaged beverage is required in a commercial product thereof to have no change in liquid properties, such as fine precipitates or anticipation thereof, which must not be passed over, to a much higher effect than normal beverages of taste.

In addition, it is commercially required that the coffee product has the natural coffee taste. That is, in production procedures, prevention of an odd taste and an offensive smell is strongly demanded.

Under such circumstances, the present inventors have investigated and found that, by controlling a mass ratio of chlorogenic acids/tannin and a ratio of dichlorogenic acids/chlorogenic acids within specific ranges, a packaged coffee beverage, which is prevented from an odd taste and an offensive smell after a long-term storage, having a good coffee taste and flavor, containing chlorogenic acids at a relatively high concentration, is provided, solving the issue of stability in a long-term storage.

According to the present invention, a packaged coffee beverage can be produced and be commercially distributed, which contains chlorogenic acid at a relatively high concentration, solves the issue of stability in a long-term storage and prevents generation of an odd taste and an offensive smell after a long-term storage, having a good coffee taste and flavor.

From the viewpoints of physiological effect and taste stability, the packaged coffee beverage of the present invention contains chlorogenic acids in an amount of not less than 0.1% by mass and less than 0.14% by mass, preferably 0.11% to 0.135% by mass, and more preferably 0.11 to 0.13% by mass. The chlorogenic acids include three acids, ($A^1$) monocaffeoylquinic acid, ($A^2$) ferulaquinic acid, and ($A^3$) dicaffeoylquinic acid. The monocaffeoylquinic acid ($A^1$) is at least one acid selected from 3-caffeoylquinic acid, 4-caffeoylquinic acid, and 5-caffeoylquinic acid. The ferulaquinic acid ($A^2$) is at least one acid selected from 3-ferulaquinic acid, 4-ferulaquinic acid, and 5-ferulaquinic acid. The dicaffeoylquinic acid ($A^3$) is at least one acid selected from 3,4-dicaffeoylquinic acid, 3,5-dicaffeoylquinic acid, and 4,5-dicaffeoylquinic acid. The content of the chlorogenic acids can be measured by high performance liquid chromatography (HPLC). HPLC generally uses UV detection as a detection means. For more sensitive detection, CL (chemiluminescence) detection, EC (electrochemical) detection, LC-Mass detection, and the like may also be used.

In the packaged coffee beverage of the present invention, a mass ratio of chlorogenic acids/tannin (FOLIN-DENIS method) is preferably 0.6 to 1.0, more preferably 0.62 to 0.9, and even more preferably 0.65 to 0.85. Within the range, the packaged coffee beverage preferably has a natural taste derived from roast beans and increased storage stability while containing chlorogenic acids at high concentrations.

In the present invention, from the viewpoints of taste stability and ease of controlling a taste balance, a mass ratio of dichlorogenic acids/chlorogenic acids, or ($A^3$)/[($A^1$)+($A^2$)+($A^3$)] is preferably 0.07 to 0.16, more preferably 0.08 to 0.15, and even more preferably 0.09 to 0.14.

A coffee extraction liquid of roast coffee beans used in the present invention can be prepared using an extraction liquid from coffee beans, an aqueous solution of instant coffee, liquid essence of coffee, and the like.

Any kind of coffee beans can be used for preparing the coffee extraction liquid of the present invention without specific limitation. Examples of the coffee bean include Brazil, Colombia, Tanzania, Mocha, Kilimanjaro, Mandheling, and Blue Mountain. Examples of the species of coffee bean include arabica and robusta. These coffee beans may be used alone or in combination. For producing roast coffee beans from coffee beans, preferred examples of a method of roasting include direct firing (flame-roasting), hot-air blowing or a semi-hot air blowing (combination of indirect firing and hot air blowing, more preferably with a rotating drum. A roasting temperature is generally 100 to 300° C., and more preferably 150 to 250° C. From the viewpoint of taste, roasted beans are preferably cooled to 0 to 100° C., and more preferably 10 to 60° C. within one hour from the end of roasting. Examples of a roast degree of coffee bean include light, cinnamon, medium, high, city, full city, french, and italian. Preferred are light, cinnamon, medium, high, and city.

The roast degree can be represented by an L value measured with a color difference meter, and is 10 to 50, and preferably 15 to 25. A mixed extraction liquid from two or more roast coffee beans having different roast degrees is preferably used. Mixing two or more extraction liquids allows to control a mass ratio of chlorogenic acids/tannin and a ratio of dichlorogenic acids/chlorogenic acids, resulting in a coffee beverage having good coffee taste and flavor and satisfactory storage stability.

Specifically, extraction liquid of coffee beans having a roast degree of an L value of 40 to 60 can be combined with that of coffee beans having a roast degree of an L value of 10 to 39. Extraction liquid of coffee beans having a roast degree of an L value of 45 to 55 can be more preferably combined with that of coffee beans having a roast degree of an L value of 15 to 25. Extraction liquid of coffee beans having a roast degree of an L value of 47 to 53 can be even more preferably combined with that of coffee beans having a roast degree of an L value of 16 to 24. Extraction liquid of coffee beans having a roast degree of an L value of 46 to 51 can be even more preferably combined with that of coffee beans having a roast degree of an L value of 16.5 to 24. In cases of using a mixed extraction liquid from coffee beans having different roast degrees or using a single extraction liquid from coffee beans having the same roast degree, an extraction liquid from raw coffee bean may be used together.

Alternatively combination of L value of 14 to 25 with 35 to 55 is preferable, more preferably combination of 16 to 24 with 40 to 50, even more preferably combination of 17 to 24 with 42 to 48, even more preferably combination of 20 to 24 with 44 to 48.

In the packaged coffee beverage or the method for producing the same of the present invention, extracts of at least two coffee beans having different roast degrees may be used. One roast coffee bean has an L value of 14 to 25 (hereinafter, also referred to as deep roast bean). The other roast coffee bean has an L value of 35 to 55 (hereinafter, also referred to as light roast bean).

In the method of the present invention, a coffee extraction liquid of the deep roast bean is treated with an adsorbent to give a coffee extract (a) (step 1). The deep roast bean has strong coffee taste and flavor drawn out and can provide increased preferences. An L value is preferably in the range of 16 to 24, more preferably 17 to 24, and even more preferably 20 to 24.

In the method of the present invention, a coffee extract (b) produced from the light roast bean is used. The light roast bean preferably has an L value of 40 to 50, more preferably 42 to 48, and even more preferably 44 to 48. A bean having such a roast degree contains a large amount of chlorogenic acid and a very small amount of hydroxyquinone, which is preferable. Mixing of the extracts (a) with (b) produced from an extraction of light roast beans thus allows to produce a coffee beverage having potential hypotensive effects while providing increased preferences. In the present specification, the coffee extract (b) refers to both a coffee extraction liquid of light roast bean as it is and a processed product thereof. The latter is also referred to as a "coffee essence (or simply "essence")".

In a preferred embodiment of the method of the present invention, a coffee essence produced by condensing the coffee extraction liquid of light roast bean is used. Use of the essence has an advantage of easily increasing a solid content in a coffee beverage. Any method for condensing the coffee extraction liquid can be employed, including evaporation, ultrafiltration membrane, and freeze-dry methods. A coffee solid content in the coffee essence (Brix) is preferably 15 to 100, more preferably 20 to 95, and even more preferably 25 to 90 in production of a coffee beverage for easily mixing to a uniform state and easily increasing a solid content.

Next, the coffee extracts (a) and (b) are mixed to give a coffee liquid (step 2).

A mixing ratio of these extracts is preferably 3 to 8 of a weight ratio of coffee solid content in (a)/coffee solid content in (b). From the viewpoints of rich taste and flavor of coffee and storage stability, the mixing ratio is preferably 3 to 7.9, and more preferably 4 to 7. Any method for mixing can be used, including a batch method and a continuous method. In mixing, an appropriate stirrer is preferably used, including an agitating blade and a static mixer.

Examples of a method for extracting from roast coffee beans include extraction from roast coffee beans or a ground product thereof with an extracting medium such as water (0 to 100° C.). Examples of a method of extraction include boiling, espresso, siphon, and drip (with paper, fabric, or the like). A method of extracting from raw coffee beans may also be selected from these methods.

Examples of the extracting medium include water, alcohol-containing water, milk, and carbonated water. A pH of the extracting medium is generally 4 to 10, and from the viewpoint of taste, preferably 5 to 7. The extracting medium may contain a pH adjuster such as sodium hydrogen bicarbonate, sodium hydrogen carbonate, L-ascorbic acid, and L-ascorbic acid Na salt to adjust pH appropriately.

Examples of an extracting device include paper drip, non-woven fabric drip, siphon, fabric drip, espresso machine, coffee machine, percolator, coffee press, ibrik, water dripping device, boiling device, heating kettle, stirring and stirrable kettle, paper or non-woven fabric sac-like structure that can substantially be suspended across a coffee cup, drip extracting device having a spray nozzle at the upper part and a structure (e.g., mesh and punched metal) that can substantially separate solid and liquid of coffee beans at the lower part, and column extracting device having structures (e.g., mesh and punched metal) that can substantially separate solid and liquid of coffee beans at the upper and the lower parts. An extracting device may have a heating or cooling structure (e.g., electric heater and a hot water-, steam-, or cold water-circulating jacket).

Examples of the method for extraction include batch extraction, semi-batch extraction, and continuous extraction. In batch or semi-batch extraction, an extraction time is 10 seconds to 120 minutes, and from the viewpoint of taste, preferably 30 seconds to 30 minutes.

A coffee extraction liquid is preferably treated with activated charcoal. The treatment with activated charcoal as an adsorbent can selectively decrease the content of hydroxyhydroquinone without decreasing an amount of chlorogenic acids. The treatment also preferably contributes to taste and maintains a content of potassium at a mass ratio of not less than 1/5, more preferably not less than 1/2, to chlorogenic acids without decreasing the potassium content.

For example, a batch treatment with activated charcoal can include adding activated charcoal to a liquid containing a coffee extraction liquid, stirring for 0.5 minutes to five hours at −10 to 100° C., and removing activated charcoal. The treatment is performed under an atmosphere of, for example, the air or an inert gas (e.g., nitrogen gas, argon gas, helium gas, and carbon dioxide gas). From the viewpoint of taste, the inert gas is preferred.

Liquid containing coffee extraction liquid is passed, for example, through an activated charcoal column filled with activated charcoal, by supplying the liquid to the column at the top or bottom part and discharging the liquid at the other part. An amount of activated charcoal filled in an activated charcoal column may be as much as can be filled in the column before the liquid passes. The activated charcoal column is required to have a separation structure for substantially preventing activated charcoal from leaking out by having one mesh (net) or a perforated metal sheet at least at the upper or lower part.

An amount of activated charcoal is 0.01 to 100 times of a soluble solid content derived from coffee bean (Brix) in the coffee extraction liquid. From the viewpoint of taste, activated charcoal is used in the 0.02 to 1.0 time amount, and a resin carrier of reverse phase chromatograph is used in the 2 to 100 times amount.

Activated charcoal preferably has an average pore radius of not more than 5 angstrom (Å), more preferably in the range of 2 to 5 angstrom, and even more preferably 3 to 5 angstrom, in a micro-pore region. In the present invention, the "micro-pore region" refers to pores of not more than 10 angstrom. An average pore radius is a value of pore radius at which a pore distribution curve measured by an MP method has a peak top. The MP method is for measuring pores, described in Colloid and Interface Science, 26, 46 (1968), and used by Sumika Chemical Analysis Service, Ltd. and Toray Research Center, Inc.

For the activated charcoal, preferred is coconut shell activated charcoal, and more preferred is coconut shell steam-activated charcoal. Shirasagi WH2C, WH2CL, W2CL, W2C, EH (Japan Enviro Chemicals. Ltd), Taikou CW (Futamura Chemical Co., Ltd), and Kuraray coal GW (Kuraray Chemical Co., Ltd.) can be used as commercially available activated charcoal.

In a step of treatment with activated charcoal, a coffee extraction liquid alone is preferably treated, but a mixture of the liquid with materials such as sodium hydrogen carbonate may be treated.

When extraction liquids of coffee beans having different roast degrees and of raw beans are used together, the liquids may be treated with activated charcoal separately from each other, or mixed liquids may be treated.

An extraction liquid of light roast bean may or may not be treated with an adsorbent. An extraction liquid treated with an adsorbent has a mild flavor and a light taste, which is easy to drink for a person who does not like coffee. The extraction liquid also more ensures hypotensive effects. An extraction liquid not treated with an adsorbent still has natural coffee taste, rich flavor, and a good body, which is easy to drink for a person who likes coffee. The extraction liquid is expected to exhibit hypotensive effects through continuous drinking. In addition, the extraction liquid not treated with an adsorbent is produced more simply, which is preferred from the viewpoint of production efficiency and cost.

In production of the coffee beverage in the present invention, a mannan-degrading enzyme is preferably added to a coffee extraction liquid before heat-sterilization. The mannan-degrading enzyme prevents generation of precipitation during storage to increase stability of a coffee beverage. In the treatment of a coffee liquid with a mannan-degrading enzyme, any enzyme from any source can be used without specific limitation as long as it has a mannan-degrading activity. The mannan-degrading enzymes are classified into two types, i.e., α and β types. The β type enzyme is preferred. Conditions such as a reaction temperature, time, pH, and an amount added may be optimized according to a source and an activity of an enzyme used. Examples of the source include filamentous fungi (*Aspergillus aculeatus, Aspergillus awamori, Aspergillus niger, Aspergillus oryzae, Aspergillus usamii, Humicola insolens, Trichoderma harzianum, Trichoderma koningii, Trichoderma longibrachiatum, Trichoderma viride*), *Bacillus* species (*Bacillus subtilis*), and basidiomycetes (*Corticium, Pycnoporus coccineus*). In Examples described below, a mannanase of 500 U/g derived from *Aspergillus aculeatus* was used. An amount added per gram of coffee solid content is preferably 0.1 to 100 U, more preferably 0.2 to 50 U, even more preferably 0.3 to 10 U, and even more preferably 0.4 to 3 U. As used herein, 1 U refers to an amount that increases a reducing force corresponding to 1 μmol of mannose for one minute under conditions of 40° C. and pH 5.0. The enzyme added does not need to be removed after the reaction.

When extraction liquids of coffee beans having different roast degrees and of raw bean are used together, the liquids may be treated with a mannan-degrading enzyme separately from each other, or mixed liquids may be treated.

When both treatments with activated charcoal and a mannan-degrading enzyme are conducted, an order of treatments is not specifically limited. Either treatment is conducted first.

The method of the present invention preferably includes a step of adding a mannan-degrading enzyme to the coffee extract (a) or a coffee liquid, prepared by mixing the coffee extract (a) with the coffee extract (b), after the step 1 of treatment with an adsorbent and before the step 3 of heat-sterilizing. More specifically, a mannan-degrading enzyme may be added to the coffee extract (a) prepared in the step 1, or to a mixture of the coffee extract (a) with the coffee extract (b).

The method of the present invention may include the step of adding a mannan-degrading enzyme to a coffee extraction liquid before the treatment with adsorbent.

In a method using two coffee beans having different roast degrees and activated charcoal and a mannanase, a coffee extract of a deep roast coffee bean may be treated with the adsorbent and then with the mannanase, or with the mannanase and then with the adsorbent.

In the packaged coffee beverage of the present invention, from the viewpoint of natural coffee taste, a content of $H_2O_2$ (hydrogen peroxide) is preferably not more than 1 ppm, more preferably not more than 0.1 ppm, and even more preferably not more than 0.01 ppm. Hydrogen peroxide can be measured with a common hydrogen peroxide meter such as a sensitive hydrogen peroxide meter Super Oritector model 5 (Central Kagaku Corp.).

Preferably, the packaged coffee beverage of the present invention substantially has no peak in a region of 0.54 to 0.61 of relative retention time to gallic acid in analysis by high performance liquid chromatography using gallic acid as a standard substance. A substantial absence of a peak in the region can be confirmed by usual HPLC, for example, using a gradient eluent containing 0.05 M aqueous acetic acid and 0.05 M acetic acid in 100% acetonitrile, an ODS column, and a UV absorptiometer.

In the present invention, the substantial absence of a peak in the region of 0.54 to 0.61 of relative retention time to gallic acid means that a ratio of peak areas S2 to S1 satisfies S2/S1<0.01, wherein S1 is a peak area of a 1 ppm gallic acid solution and S2 is a total area of peaks corresponding to ingredients eluting within the region in the coffee beverage composition, measured under the same conditions.

Production of the packaged coffee beverage of the present invention includes heat sterilization setting an F0 value (fatal value) to a specific value or more. The heat sterilization may be performed before or after packaging in a container. From the viewpoint of microbiological stability, an F0 value is 5 to 60, preferably 10 to 50, more preferably 15 to 40, and even more preferably 17 to 35. As used herein, the "F0 value" is for evaluating an effect of heat sterilization on a canned coffee beverage and refers to a heating time (min) at a standard temperature (121.1° C.). An F0 value is calculated by multiplying a heating time (min.) by a fatality rate (1 at 121.1° C.) to a temperature of the inside of a container. A fatality rate can be determined according to a table of fatality rate (M. Fujimaki et. al., "Syokuhin Kougyou (Food Engineering)", Kouseisha-kouseikaku Corporation, 1985, p. 1049). For calculating an F0 value, standard methods of area calculation and formulae can be used (see, for example, Tanigawa et. al., "Kanzume Seizougaku (Production of canned food)", p. 220, Kouseikaku).

In the present invention, to achieve an intended F0 value, a heating temperature and a heating time are appropriately determined according to a fatality rate curve that has been previously generated.

A sterilizer can be of a batch type or a continuous type. Examples of the batch sterilizer include a retort pot. Examples of the continuous sterilizer include a tube sterilizer, a plate sterilizer, an HTST plate sterilizer, and a UHT sterilizer.

In the present invention, from the viewpoint of effective prevention of increase of hydroxyhydroquinone, a sterilization time is not more than 10 minutes, preferably 100 seconds to 9 minutes, and more preferably 110 seconds to 7 minutes.

From the viewpoint of microbiological stability, a sterilization temperature is preferably not less than 123° C., more preferably 123 to 150° C., even more preferably 126 to 141° C., and even more preferably 130 to 140° C.

The heat sterilization is conducted under the conditions above or, in cases of containers such as a metal can that can be heat-sterilized after filled with a content, under the sterilization conditions set by Japan's Food Sanitation Act. Rising of a temperature up to the conditions set for heat sterilization and cooling must be quickly performed in order not to leave an excess thermal history. Also in cases of metal cans, a coffee liquid may be heat-sterilized and then filled. The same is applied to paper containers and bottles. Filling in a container may be before or after heat sterilization, considering heat-resistance of the container.

The packaged coffee beverage of the present invention can further contain sugars such as sucrose, glucose, fructose, xylose, fructose-glucose liquid, and sugar alcohols, an antioxidant, a pH adjuster, an emulsifier, and a flavorant according to need. From the viewpoints of taste and stability of beverage, pH of the coffee composition is preferably 5 to 7, more preferably 5.4 to 6.5, and even more preferably 5.5 to 6.2.

In production of the packaged coffee beverage of the present invention, containers such as can (aluminium can and steel can), paper container, retort pouch, and bottle (glass) can be used for packaging. In this case, a product filled in a container can be a canned coffee beverage of 50 to 500 mL.

The canned coffee beverage is preferably of single strength. As used herein, the "single strength" means that a packaged beverage is drinkable as it is from an opened container. In a canned black coffee beverage according to the present invention, a composition ratio of monocaffeoylquinic acids is preferably as follows: a mass ratio of 4-caffeoylquinic acid/3-caffeoylquinic acid is 0.6 to 1.2; and a mass ratio of 5-caffeoylquinic acid/3-caffeoylquinic acid is 0.01 to 3. To achieve the effect of the present invention to higher degree, a packaged coffee beverage may be a packaged black coffee beverage. As used herein, the "black coffee beverage" refers to the one that does not contain milk whether it contains a sweetener or not, including black coffee without sugar, sweetened black coffee, and slightly sweetened black coffee.

From the viewpoint of preventing change of an ingredient in coffee, the container preferably has low oxygen permeability. For example, cans such as aluminium can and steel can and glass bottles are preferably used. Cans and bottles include resealable containers that can be recapped. As used herein, the "oxygen permeability" refers to a value (cc·mm/m²·day·atm) measured under the conditions of 20° C. and a relative humidity of 50%. An oxygen permeability is preferably not more than 5, more preferably not more than 3, and even more preferably not more than 1.

EXAMPLES

Analysis of Chlorogenic Acids:

A method of analyzing chlorogenic acids in a packaged coffee beverage is as follows. An analysis apparatus used was HPLC. Model numbers of constituent units of the apparatus were as follows: UV-VIS detector: L-2420 (Hitach High-Technologies Corporation), column oven: L-2300 (Hitach High-Technologies Corporation), pump: L-2130 (Hitach High-Technologies Corporation), autosampler: L-2200 (Hitach High-Technologies Corporation), column: Cadenza CD-C18 inner diameter 4.6 mm by length 150 mm, particle diameter 3 mµ(Imtakt Corporation).

Analysis conditions were as follows: injection amount of sample: 10 µL, flow rate: 1.0 mL/min, set wavelength of UV-VIS detector: 325 nm, set temperature of column oven: 35° C., eluent A: solution of 0.05M acetic acid, 0.1 mM 1-hydroxyethane-1,1-diphosphonic acid, 10 mM sodium acetate, and 5(V/V) % acetonitrile, eluent B: acetonitrile.

Condition of Concentration Gradient

| Time | Eluent A | Eluent B |
| --- | --- | --- |
| 0.0 min. | 100% | 0% |
| 10.0 min. | 100% | 0% |
| 15.0 min. | 95% | 5% |
| 20.0 min. | 95% | 5% |
| 22.0 min. | 92% | 8% |
| 50.0 min. | 92% | 8% |
| 52.0 min. | 10% | 90% |
| 60.0 min. | 10% | 90% |
| 60.1 min. | 100% | 0% |
| 70.0 min. | 100% | 0% |

For analyzing by HPLC, a precisely measured sample in an amount of 1 g was dissolved in the eluent A so as to be 10 mL, and filtered through a membrane filter (GL chromatodisk 25A, pore size: 0.45 µm, GL Sciences Inc.).

Retention Time of Chlorogenic Acids (Min.)

($A^1$) monocaffeoylquinic acid: total three points of 5.3, 8.8, and 11.6

($A^2$) ferulaquinic acid: total three points of 13.0, 19.9, and 21.0

($A^3$) dicaffeoylquinic acid: total three points of 36.6, 37.4, and 44.2

Area values of these nine chlorogenic acids were converted to percentages by mass based on 5-caffeoylquinic acid as a standard.

Analysis of Tannin (FOLIN-DENIS Method):

S (g) of coffee liquid as a sample is dissolved in ion-exchanged water to give a sample solution of a constant volume V (ml). 5 ml of aliquot is taken from the sample solution. The aliquot is mixed with 5 ml of Folin reagent and 5 ml of 10% sodium carbonate solution to react. A reaction mixture is allowed to stand for one hour at room temperature.

The reacted mixture is measured for absorbance at a wavelength of 700 nm. Using the following formula, a concentration of tannin (as tannic acid) is calculated.

Calculation Formula for Tannin (as Tannic Acid)

$$\text{tannin (g/100 g)} = A \times V/5 \times B \times 10^{-6} \times 100/S$$

(A: tannic acid concentration (μg/coloring liquid), B: dilution rate)

Reference: Gotei, Nihon Shokuhin Hyoujun Seibun hyou, Bunseki manyuaru no kaisetsu (explanation of analytical manual for standard tables of food composition in Japan, fifth revised edition)

Japan Food Research Laboratories ed./Chuohoki Publishers Co., Ltd.

Example 1

To an extraction liquid of roast coffee bean having an L value of 22 was added mannanase in an amount of 0.79 U per g of a coffee solid content, and stirred for 30 minutes at 25° C. The resultant coffee extraction liquid was passed through a column (inner diameter: 45 mm, length: 150 mm), filled with activated charcoal (Shirasagi WH2C) in an amount of 50% by weight to the soluble solid of the coffee extraction liquid at a mass ratio under the conditions of 25° C., SV20 [1/volume $[m^3]$/flow rate $[m^3/hr]$]. A roast coffee bean having an L value of 46 was extracted with water. To an extraction liquid was added ethanol to give 60% by mass ethanol aqueous solution. Insoluble matters were removed from the ethanol aqueous solution. The ethanol aqueous solution was concentrated under reduced pressure with heating to give a coffee essence. The coffee extraction liquid and the coffee essence were mixed at a ratio shown in Table 1. The mixture was adjusted for its pH with an aqueous solution of sodium hydrogen carbonate, diluted with ion-exchanged water, heated to 75° C., filled and sealed in a 190 g can, and then sterilized for 7 minutes at 129° C.

Example 2

A canned coffee beverage was similarly prepared as in Example 1, except that a mixing ratio of the coffee extraction liquid and the coffee essence was changed.

Comparative Example 1

An extraction liquid of coffee bean having an L value of 22 treated with mannanase, prepared in the same way as in Example 1, was passed through a column filled with activated charcoal under the same conditions as in Example 1. The treated extraction liquid was adjusted for its pH with an aqueous solution of sodium hydrogen carbonate, diluted with ion-exchanged water at a ratio shown in Table 1, heated to 75° C., filled and sealed in a 190 g can, and then sterilized for 7 minutes at 129° C.

Comparative Example 2

A coffee essence of coffee bean having an L value of 46, prepared in the same way as in Example 1, was treated with mannanase and activated charcoal in the same way as in Example 1. The treated coffee essence was adjusted for its pH with an aqueous solution of sodium hydrogen carbonate, diluted with ion-exchanged water at a ratio shown in Table 1, heated to 75° C., filled and sealed in a 190 g can, and then sterilized for 7 minutes at 129° C.

Comparative Example 3

An extraction liquid of coffee bean having an L value of 22 was adjusted for its pH with an aqueous solution of sodium hydrogen carbonate, diluted with ion-exchanged water, heated to 75° C., filled and sealed in a 190 g can, and then sterilized for 10 minutes at 118° C.

The prepared canned coffee beverages were evaluated for stability in storage at a heated state, odd taste and offensive smell due to the treatment with enzyme, and coffee taste and flavor based on the following ratings. Results are shown in Table 1.

stability in storage at a heated state (after stored for 10 days at 65° C., visual examination)
1: no precipitation
2: very little precipitation
3: little precipitation
4: precipitation
5: much precipitation rating of odd taste and offensive smell due to the treatment with enzyme (after stored for 10 days at 65° C.)
1: similar to a control
2: slightly recognizable odd taste and offensive smell
3: recognizable odd taste and offensive smell
4: readily recognizable odd taste and offensive smell rating of coffee taste and flavor (after stored for 10 days at 65° C.)
1: strong coffee taste and flavor
2: slightly strong coffee taste and flavor
3: neutral
4: slightly weak coffee taste and flavor
5: weak coffee taste and flavor

TABLE 1

|  |  | Example 1 | Example 2 | Comparative Example 1 | Comparative Example 2 | Comparative Example 3 |
|---|---|---|---|---|---|---|
| Amount of chlorogenic acid | mass % | 0.1 | 0.13 | 0.1 | 0.1 | 0.2 |
| chlorogenic acids/tannin (FOLIN-DENIS method) | mass ratio | 0.63 | 0.72 | 0.53 | 1.18 | 0.62 |
| dicaffeoylquinic acid/nine chlorogenic acids | mass ratio | 0.113 | 0.11 | 0.06 | 0.172 | 0.059 |
| extraction liquid (L value: 16 to 25) |  | ○ | ○ | ○ | X | ○ |
| essence (L value: 45 to 55) |  | ○ | ○ | X | ○ | X |
| coffee solid content | mass % | 1.1 | 1.4 | 1.6 | 0.4 | 2.2 |
| sterilization temperature/sterilization time | ° C./minute | 129/7 | 129/7 | 129/7 | 129/7 | 118/10 |
| FO |  | 43 | 43 | 43 | 43 | 5 |

TABLE 1-continued

|  |  | Example 1 | Example 2 | Comparative Example 1 | Comparative Example 2 | Comparative Example 3 |
|---|---|---|---|---|---|---|
| <Composition> |  |  |  |  |  |  |
| Extracted liquid(L value 22: coffee solid 2.9) | mass % | 31.31 | 40.71 | 57.27 | — | 9.2 |
| Coffee essence (L value 46: coffee solid content 66) | mass % | 0.253 | 0.329 | — | 0.562 | — |
| Ion-exchange water | mass % | balance | balance | balance | balance | balance |
| Total | mass % | 100 | 100 | 100 | 100 | 100 |
| adjusted pH |  | 6.2 | 6.2 | 6.2 | 6.2 | 6.1 |
| pH after sterilized |  | 5.8 | 5.8 | 5.8 | 5.8 | 5.6 |
| Enzyme treatment |  | treated | treated | treated | treated | None |
| treating time with enzyme |  | before treatment with activated charcoal | before treatment with activated charcoal | before treatment with activated charcoal | before treatment with activated charcoal | — |
| mannanase/coffee solid content | ppm/g | 111 | 111 | 111 | 111 | — |
| mannanase/coffee solid content | U | 0.79 | 0.79 | 0.79 | 0.79 | — |
| stability in storage at heated state (65° C., for 10 days) |  | 1 | 1 | 1 | 1 | 4 |
| odd taste and offensive smell due to treatment with enzyme (65° C., for 10 days) |  | 1 | 1 | 2 | 2 | 1 |
| coffee taste and flavor (65° C., for 10 days) |  | 2 | 1 | 2 | 5 | 1 |

The invention claimed is:

1. A packaged coffee beverage subjected to heat-sterilization, wherein the sterilized packaged coffee beverage comprises
   (A) a concentration of chlorogenic acids which is not less than 0.1% by mass and less than 0.14% by mass,
   (B) a mass ratio of chlorogenic acids/tannin as determined by the FOLIN-DENIS method in the range of 0.65 to 0.85, and
   (C) a mass ratio of dicaffeoylquinic acid/chlorogenic acids in the range of 0.07 to 0.16.

2. The packaged coffee beverage according to claim 1, wherein the package is a can.

3. The packaged coffee beverage according to claim 1 or 2, comprising extraction liquids of at least two roast coffee beans having different roast degrees.

4. The packaged coffee beverage according to claim 1 or 2, comprising an extraction liquid of roast coffee beans treated with activated charcoal.

5. The packaged coffee beverage according to claim 1 or 2, comprising an extraction liquid of roast coffee beans treated with a mannan-degrading enzyme.

6. The packaged coffee beverage according to claim 1 or 2, which is sterilized at a temperature of not less than 123° C.

7. A method for producing the packaged coffee beverage according to claim 1, comprising:
   (1): treating a coffee extraction liquid of roast coffee bean having an L value of 14 to 25 with an adsorbent to give a coffee extract (a);
   (2): mixing the coffee extract (a) with a coffee extract (b) of roast coffee bean having an L value of 35 to 55 to give a coffee liquid; and
   (3): heat-sterilizing the coffee liquid,
   and further comprising adding a mannan-degrading enzyme to the coffee extraction liquid before (3).

8. The method for producing the packaged coffee beverage according to claim 7, comprising the step of adding a mannan-degrading enzyme to the coffee extraction liquid before the treatment with the adsorbent.

9. The method for producing the packaged coffee beverage according to claim 7, wherein a weight ratio of coffee solid content in (a)/coffee solid content in (b) is from 3 to 8.

10. The method for producing the packaged coffee beverage according to claim 7, wherein the mannan-degrading enzyme is β-type enzyme.

11. The packaged coffee beverage according to claim 1, wherein the concentration of chlorogenic acids is from 0.11 to 0.13% by mass.

12. The packaged coffee beverage according to claim 1, wherein the mass ratio of dicaffeoylquinic acid/chlorogenic acids is from 0.09 to 0.14.

* * * * *